Dec. 11, 1962    A. CAUNT    3,067,596
JOINTS
Filed Oct. 21, 1960    2 Sheets-Sheet 1
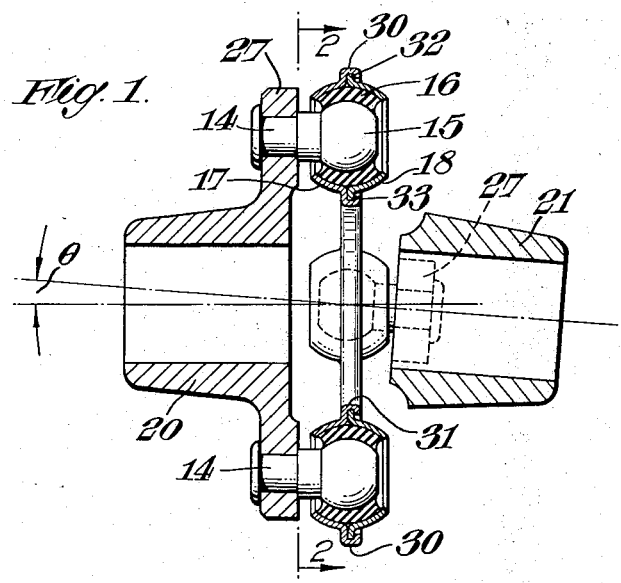
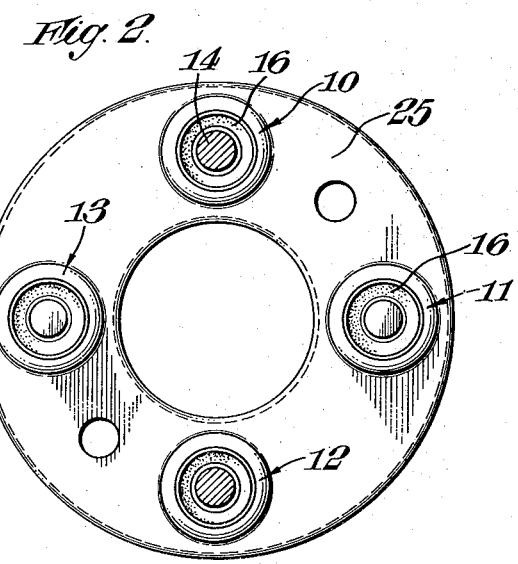 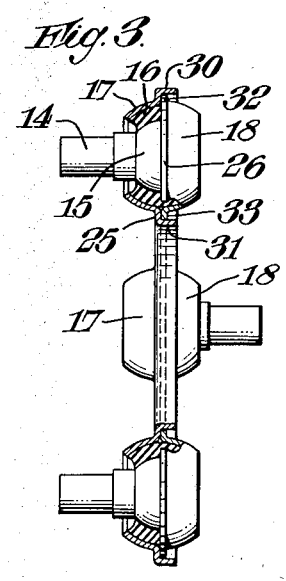
Inventor:
Alan Caunt
By Kemon, Palmer & Stewart
Attorneys Dec. 11, 1962  A. CAUNT  3,067,596
JOINTS
Filed Oct. 21, 1960  2 Sheets-Sheet 2
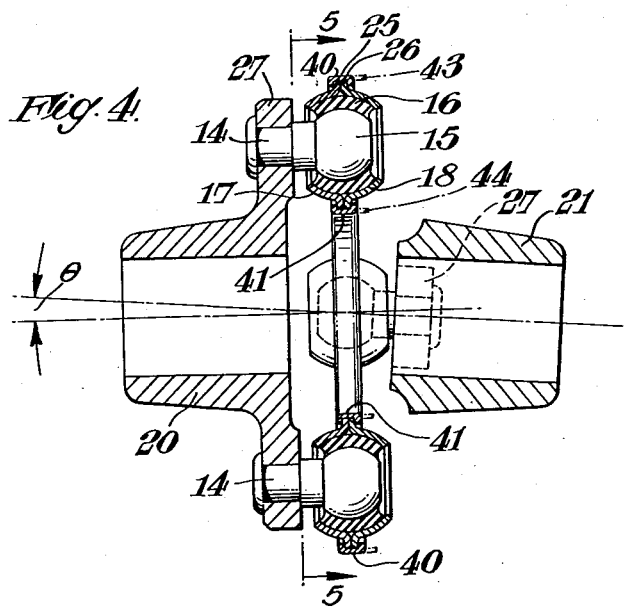
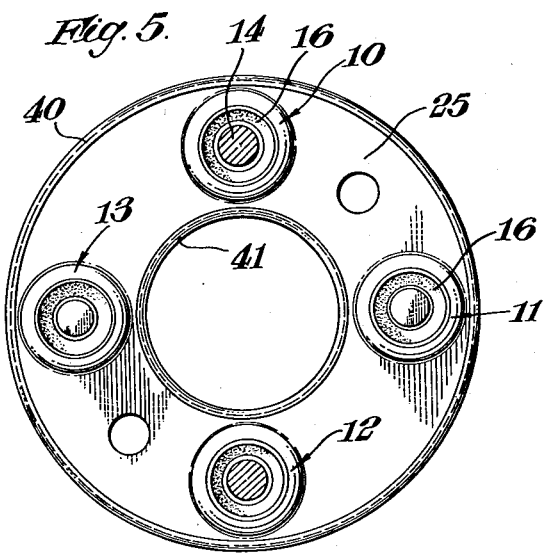

United States Patent Office 3,067,596
Patented Dec. 11, 1962

3,067,596
JOINTS
Alan Caunt, Oadby, England, assignor to Metalastik Limited, Leicester, England, a British company
Filed Oct. 21, 1960, Ser. No. 64,184
Claims priority, application Great Britain Oct. 23, 1959
2 Claims. (Cl. 64—11)

This invention relates to joints which accommodate misalignment by distortion of rubber or the like bushes, and concerns joints of the kind comprising one or more ball joints each having an inner ball-like part and two cup-like portions which envelope the ball-like part and which house a layer of rubber or the like resilient material, hereinafter referred to as rubber, between the ball-like part and the cups, the cup-like portions of the ball joints being formed as cup-like depressions in one or more pairs of plate members which are clamped together face to face.

According to the invention there is provided a joint of the kind described, wherein the plate members or each pair of plate members are held clamped together face to face by a part or parts surrounding a periphery of the plate members and locked over the corresponding peripheral edge of at least one of the plate members.

The plate members or each pair of plate members may, according to a feature of the invention, be clamped together by inter-engaging parts of the plate members.

Thus said clamping part or parts may be composed of or comprise peripheral edge parts of the plate members or one of the plate members. Alternatively however, said clamping part or parts may be composed of or comprise parts separate of the plate members.

The invention may be applied to a joint of the kind described which is a universal joint comprising a single pair of plate members clamped together and shaped with pairs of juxtaposed cups at equally spaced points on a pitch circle, each pair of cups enveloping a ball-like part and housing a layer of rubber between the ball-like part and the cups. Conveniently, in this case, the plate members may be in the form of discs or the plate members may be annular.

Alternatively, the invention may be applied to a joint of the kind described which is a universal joint comprising substantially tangential rigid links inter-connecting driving and driven spiders or flanges, each link comprising a pair of plate members clamped together and shaped wtih juxtaposed cups, one pair towards each end of the link formed by the plate members, the pairs of cups each enveloping a ball-like part and housing a layer of rubber between the ball-like part and the cups.

With a universal joint as described in either of the two immediately preceding paragraphs one of the plate members or one of each pair of the plate members may according to the invention have at its outer peripheral edge a circumferential flange part which is spun, swaged or otherwise locked over the outer peripheral edge of the other of the plate members thereby to clamp the plate members together.

Where the plate members are annular plate members one of them may according to the invention have at its inner peripheral edge a circumferential flange part which is spun, swaged or otherwise locked over the inner peripheral edge of the other thereby to clamp the annular plate members together.

In this case said one of the annular plate members may according to a still further feature of the invention have in addition, at its outer peripheral edge, a circumferential flange part which is spun, swaged or otherwise locked over the outer peripheral edge of said other of the annular plates thereby to clamp the annular plate members together.

Alternatively the outer circumferential flange part may be on said other of the annular plate members and spun, swaged or otherwise locked over the outer peripheral edge of said one of the annular plate members.

Instead of using peripheral edge parts of the plate members to clamp them together, the plate members or each pair of plate members may according to a still further feature of the present invention, be held clamped together at their outer peripheral edges or in the case of annular plate members at their outer and/or inner peripheral edges by a separate channel-section metal strip extending around the peripheral edges and embracing a peripheral edge region of the plate members.

Specific embodiments of the present invention will now be described, merely by way of example, with reference to the accompanying drawings, whereof:

FIG. 1 is a cross-section of a universal joint in accordance with the present invention, and showing the joint connecting driving and driven flanges on driving and driven shafts respectively, FIG. 2 is a cross-section on line 2—2 in FIG. 1, FIG. 3 is a partial cross-section corresponding with FIG. 1 and showing the joint in a partially assembled condition, FIG. 4 is a cross-section of a further universal joint in accordance with the present invention and again showing the joint connecting driving and driven flanges on driving and driven shafts respectively, and FIG. 5 is a cross-section on line 5—5 in FIG. 4.

Referring first to FIGS. 1 to 3 the universal joint thereshown comprises, in this case, four ball joints indicated at 10, 11, 12 and 13 respectively in FIG. 2. Each ball joint comprises a rod-like member or spigot 14 formed with a part spherical enlargement or protuberance 15 constituting an inner ball-like part on which is bonded a one piece layer of rubber 16, which layer is, in the present example, although not necessarily, of uniform thickness and externally spherical, at least the inner surface, and in the present example both the inner and the outer surface of the rubber layer conforming substantially to the shape of the enlargement or protuberance 15 prior to assembly of the inner member and the rubber layer in an outer member which will now be described.

The outer member comprises two cup portions 17, 18 which are arranged co-axially of the inner member 14 in juxtaposition and are clamped together in the manner hereinafter described.

The rubber layer 16 is symmetrical on both sides of the joining face between the cup portions 17, 18 and extends so as to cover only the part spherical surface of the enlargement or protuberance 15 on the inner member.

The universal joint is shown coupling a shaft 20, which for convenience only is referred to as the driving shaft, to a shaft 21 which for convenience is referred to as the driven shaft. The two shafts are shown somewhat out of angular alignment, the two shafts, their axes making an angle θ between them.

The cup portions 17, 18 of the four ball joints are formed as pressings respectively in two annular plate members 25, 26 (see FIGS. 2 and 3) the plates being positioned face to face to juxtapose the respective pairs of cup portions. The plates 25 and 26 are arranged between the ends of the two shafts.

The ball joints 10, 11, 12 and 13 are uniformly spaced around the intermediate member constituted by the two plates on a common pitch circle. Those on one diameter, the vertically disposed diameter in FIG. 2 are associated with the driving shaft 20, and those on the other diameter, the horizontal diameter in FIG. 2 are associated with the driven shaft 21. Each shaft end has a flange or spider 27 in which are fixedly located the inner elements 14 of the ball joints, in the present example by riveting over their ends.

The inner elements may alternatively be made with holes through them in a direction perpendicular to the plane of the plates 25, 26 in order to take bolts or rivets to affix them to the spiders 27.

The two plates 25, 26 are clamped together, thereby to clamp the juxtaposed cup portions 17, 18 together by inter-engaging peripheral edge parts of the two plates. Thus the plate 25 is formed with an axially directed circumferential flange 30 at its outer peripheral edge and a similarly directed circumferential flange 31 at its inner peripheral edge.

The plate 25 is assembled against the plate 26 so as to lie snugly between the flanges 30 and 31 as shown in FIG. 3, with the cup portions juxtaposed as required, and the flanges 30 and 31 are then spun over, as shown in FIG. 2, so as to engage and lock with the outer and inner peripheral edge parts 32 and 33 respectively of the plate 26 thereby to hold the plates clamped together.

The plates are in this manner joined without recourse to bolting or welding in a simple cheap and efficient manner.

Instead of the axes of the inner members 14 being parallel with the axes of the driving and driven shafts respectively they may be radial.

Instead of using peripheral edge flange parts 30 of the plates 25, 26 to clamp them together separate metal straps may be used as is shown in, and will now be described with reference to FIGS. 4 and 5, in which parts corresponding with parts already described with reference to FIGS. 1 to 3 are indicated by the same reference numerals.

The plates 25, 26 are in this case of equal diameter and held clamped together by channel-section metal straps 40, 41 the outer one, 40, of which surrounds the plate and embraces an outer peripheral edge region of the plates and the inner one, 41, of which extends round the inner peripheries of the plates and embraces an inner peripheral edge region of the plates.

The straps 40, 41 are in the present example endless straps in the sense that each is formed from an L-sectioned ring.

The rings are assembled with one flange abutting the out-turned face of the plate 25, the outer ring around the outer peripheral edge of the plate and the inner ring around the inner peripheral edge of the plate the other flange of the rings, indicated in chain dotted lines at 43 and 44 in FIG. 4 lying close to the outer and inner peripheral edges of both of the plates and each having a width dimension such that it upstands from the out-turned face of the plate 26. The upstanding parts of the flanges 43 and 44 are then spun, swaged or otherwise locked over to clamp the plates together around their inner and outer peripheries, at the same time deforming the L-sectioned rings to form the channel-section straps.

In a further embodiment, not illustrated, instead of using L-sectioned rings the rings are replaced by U-sectioned or V-sectioned straps which are fitted respectively round the outer peripheral edge of the plates and around the inner peripheral edge of the plates so as closely to embrace and clamp the plates together, the ends of the straps being welded, riveted or otherwise secured either together and/or to the plates to hold the straps in place. After fitting the U or V-sectioned straps may be deformed if necessary finally to clamp the plates together.

The use of an L-sectioned ring or a U or V-sectioned strap as described to clamp the plates together at their inner peripheral edge is of particular advantage as compared with spinning or swaging over an inner peripheral edge part of one of the plates since in the latter case insufficient metal may be presented to form the swaged connection if the plates are thin.

In the latter connection it will be appreciated that it may be found to be expedient to use an outer peripheral edge part 30 of one of the plates to form an outer swaged connection between the plates and a separate ring or strap 41 to clamp the plates together at their inner periphery.

By joining the plate members 25, 26 in any of the ways described, a considerable stiffening of the assembly is achieved as compared with the case where the plates are simply bolted or riveted together. This offers the advantage of using lighter gauge plates than hitherto.

For a universal joint of the kind described and comprising tangential rigid links as hereinbefore referred to, the plate members making up each link may be held clamped together around their outer peripheral edges in any of the ways hereinbefore described for the plates 25 and 26, and it is to be understood that the present invention also includes a joint in the form of a link suitable for such a universal joint and having its plate members secured together face to face in any of these ways.

Thus the invention includes a joint of the kind described having a pair of ball joints each having an inner ball-like part and two cup-like portions which envelope the ball-like part and which contain a layer of rubber between the ball-like part and the cups, the cup-like portions of the ball joints being formed as cup-like depressions in a pair of plate members which are held clamped together face to face around their outer peripheries in any of the ways hereinbefore described.

The present invention also includes a single ball joint comprising an inner ball-like part and two cup-like portions which envelope the ball-like part and which house a layer of rubber or the like resilient material between the ball-like part and the cups, characterised in that the cup-like portions are formed as cup-like depressions in a pair of plate members which are held clamped together face to face around the outer periphery of the plate members in any of the ways hereinbefore described.

I claim:

1. A universal joint comprising a pair of annular plate members positioned face to face, the plate members having pairs of juxtaposed cups, one on each of the plate members, the pairs of cups being arranged at equi-spaced points on a common pitch circle and each pair enveloping an inner ball-like part and housing a layer of rubber like material between the ball-like part and the cups, the annular plate members being held clamped together, around their outer periphery, by a flange part overlying an outer peripheral edge portion of at least one of the plate members, and, around their inner periphery, by a channel-sectioned metal ring embracing an inner peripheral edge portion of each of the plate members.

2. A universal joint comprising a pair of annular plate members positioned face to face, the plate members having pairs of juxtaposed cups, one on each of the plate members, the pairs of cups being arranged at equi-spaced points on a common pitch circle and each pair enveloping an inner ball-like part and housing a layer of rubber like material between the ball-like part and the cups, the annular plate members being held clamped together around their inner and outer peripheries by channel-sectioned metal rings embracing inner and outer peripheral edge portions of each of the plate members.

References Cited in the file of this patent

UNITED STATES PATENTS

| | | |
|---|---|---|
| 1,817,529 | Skillman | Aug. 4, 1931 |
| 1,912,780 | Lantz | June 6, 1933 |
| 2,589,820 | Konchan | Mar. 18, 1952 |
| 2,633,719 | Riopelle | Apr. 17, 1953 |
| 2,785,549 | Harrington | Mar. 19, 1957 |

FOREIGN PATENTS

| | | |
|---|---|---|
| 766,435 | Great Britain | Jan. 23, 1957 |
| 781,797 | Great Britain | Aug. 28, 1957 |